(12) United States Patent
Chmaytelli

(10) Patent No.: US 7,644,126 B2
(45) Date of Patent: Jan. 5, 2010

(54) MESSAGE THREAD HANDLING

(75) Inventor: Mazen Chmaytelli, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 389 days.

(21) Appl. No.: 10/954,407

(22) Filed: Sep. 29, 2004

(65) Prior Publication Data

US 2006/0075040 A1     Apr. 6, 2006

(51) Int. Cl.
   *G06F 15/16* (2006.01)
(52) U.S. Cl. .................. 709/206; 709/207; 709/214; 709/223; 709/224; 379/88.17; 379/88.22; 379/88.23; 379/88.24
(58) Field of Classification Search ............... 709/206, 709/207, 202; 455/450, 466; 379/88.17
   See application file for complete search history.

(56) References Cited

U.S. PATENT DOCUMENTS

| | | | | |
|---|---|---|---|---|
| 6,029,195 | A * | 2/2000 | Herz | 725/116 |
| 6,212,573 | B1 * | 4/2001 | Lim et al. | 719/315 |
| 6,480,885 | B1 * | 11/2002 | Olivier | 709/207 |
| 6,496,853 | B1 * | 12/2002 | Klein | 709/206 |
| 6,778,834 | B2 * | 8/2004 | Laitinen et al. | 455/450 |
| 7,072,942 | B1 * | 7/2006 | Maller | 709/206 |
| 7,127,680 | B2 * | 10/2006 | Pang | 715/751 |
| 2003/0158905 | A1 * | 8/2003 | Petry et al. | 709/206 |
| 2004/0083269 | A1 * | 4/2004 | Cummins | 709/206 |
| 2005/0117715 | A1 * | 6/2005 | Bordia | 379/88.13 |
| 2005/0192819 | A1 * | 9/2005 | Smith et al. | 705/1 |

* cited by examiner

*Primary Examiner*—David Wiley
*Assistant Examiner*—Jude J Jean Gilles
(74) *Attorney, Agent, or Firm*—Fariba Yadegar-Bandari; Robert J. O'Connell

(57) ABSTRACT

Described are techniques and mechanisms for easily allowing a user to unsubscribe ("opt out") from receiving subsequent messages in a particular message thread. Generally stated, a component maintains information about a message thread that a user has indicated a desire to opt out of. The information includes identifying information about the message thread and an indication that a particular user desires to receive no further messages in the thread. New messages that are identified as belonging to that thread are handled in some fashion that differs from ordinary messages. For example, the messages may simply be deleted, may be held at a message server, may be redirected to a special storage location, or the like. The user indicates the desire to opt out through a user interface mechanism that is available in connection with the user viewing a message in the particular thread. Optionally, the user may have the ability to re-subscribe ("opt in") to the thread.

42 Claims, 8 Drawing Sheets

MESSAGE THREAD HANDLING

BACKGROUND OF THE INVENTION

The invention relates generally to the field of electronic messaging, and more particularly to systems and methods for handling threads of electronic messages.

Electronic messaging has become commonplace. It is now routinely used to conduct both formal and informal communications. Often these communications occur in a back-and-forth manner where the recipient of a first message may reply to the sender, who then replies to the recipient's reply. This communication generally looks like an electronic conversation. These electronic conversations are popular because of how easily the communication can be disseminated to a large group of people. Often, the original message is sent to several recipients, and the replies are sent to all or many of the original recipients. Perhaps additional recipients are added to the distribution list during the conversation. This type of back-and-forth communication is commonly referred to as a "thread."

Threads can be lengthy, and numerous people are sometimes included in the distribution list. However, lengthy threads can be annoying for people in the distribution list that are not very interested in the conversation. Many times the initiator of such a thread arbitrarily decides who to include in the distribution list, and recipients who would rather not be on the list are inconvenienced or, even worse, frustrated. Of course, such a recipient could reply directly to the initiator of the message and request not to receive any future messages, but this is imposing on the recipient and sometimes viewed as rude. It is also often ineffective because subsequent replies commonly don't come from the initiator of the thread, so the recipient still continues to get subsequent messages.

Message thread handling has been largely ignored by the electronic messaging industry. Accordingly, an adequate solution to these problems has eluded those skilled in the art, until now.

SUMMARY OF THE INVENTION

The invention is directed to techniques and mechanisms for easily allowing a user to unsubscribe ("opt out") of receiving subsequent messages in a particular message thread. In one aspect, the invention is directed to a method or computer-implemented instructions for message thread handling that includes receiving, at a server, an electronic message. That electronic message is analyzed to determine if the electronic message is associated with a thread for which an indication to be excluded has been received. If so, the electronic message is handled as an unwanted thread message.

In another aspect, the invention is directed to a method or computer-implemented instructions for message thread handling that includes receiving, at a client device, an electronic message that has characteristics, and receiving an indication to exclude subsequent messages in a thread to which the electronic message belongs. In response, an "opt out" message is created that describes the thread using the characteristics of the electronic message. That opt out message is then communicated to a messaging system that is responsible for handling the subsequent messages in the thread.

In yet another aspect, the invention is directed to a server that includes a message receiving component configured to receive inbound electronic messages and a message transmitting component configured to transmit outbound electronic messages. The server also includes a processing unit programmed to identify unwanted thread messages by comparing inbound electronic messages to identification information stored at the server. The identification information identifies a thread for which an indication to exclude a recipient has been received. The processing unit is further programmed to remove the recipient from a recipient list for any unwanted thread messages.

In still another aspect, the invention is directed to a client computing device that includes a message receiving component configured to receive inbound electronic messages and a message transmitting component configured to transmit outbound electronic messages. The client computing device also includes a processing unit that is programmed to display an inbound electronic message received by the message receiving component. If the client computing device receives an indication to exclude subsequent inbound electronic messages in a thread to which the inbound electronic message belongs, the processing unit is further programmed to create an opt out message and to cause the message transmitting component to deliver the opt out message to a message server.

These and other aspects of the invention will become clear upon a study of the following detailed description, in which are described several embodiments, implementations, and illustrations of the invention.

DETAILED DESCRIPTION

What follows is a detailed description of various techniques and mechanisms for message thread handling. Very generally stated, this implementation includes a message client with a component for indicating to a message server that a user desires to opt out of a thread. In response, the message server omits that user from a list of recipients for any subsequent messages in that thread. The mechanisms and techniques may also allow the user to opt back in to the thread. Those skilled in the art will appreciate that the teachings of this disclosure may be embodied in various implementations that differ significantly from those described here without departing from the spirit and scope of the claimed invention.

It should also be noted that electronic messaging takes very many forms, such as ordinary e-mail, instant messaging, Multimedia Messaging System (MMS) messages, and the like. As used throughout this document, the terms "e-messaging" and "messaging" will be used interchangeably to include any form of electronic communication using messages, regardless of the particular format or structure of messages, or protocols employed. The particular examples described below may focus on e-mail communications, but only for simplicity and consistency of discussion. The invention is not limited to e-mail systems, but rather may be embodied in any type of electronic messaging system.

Figure 1:
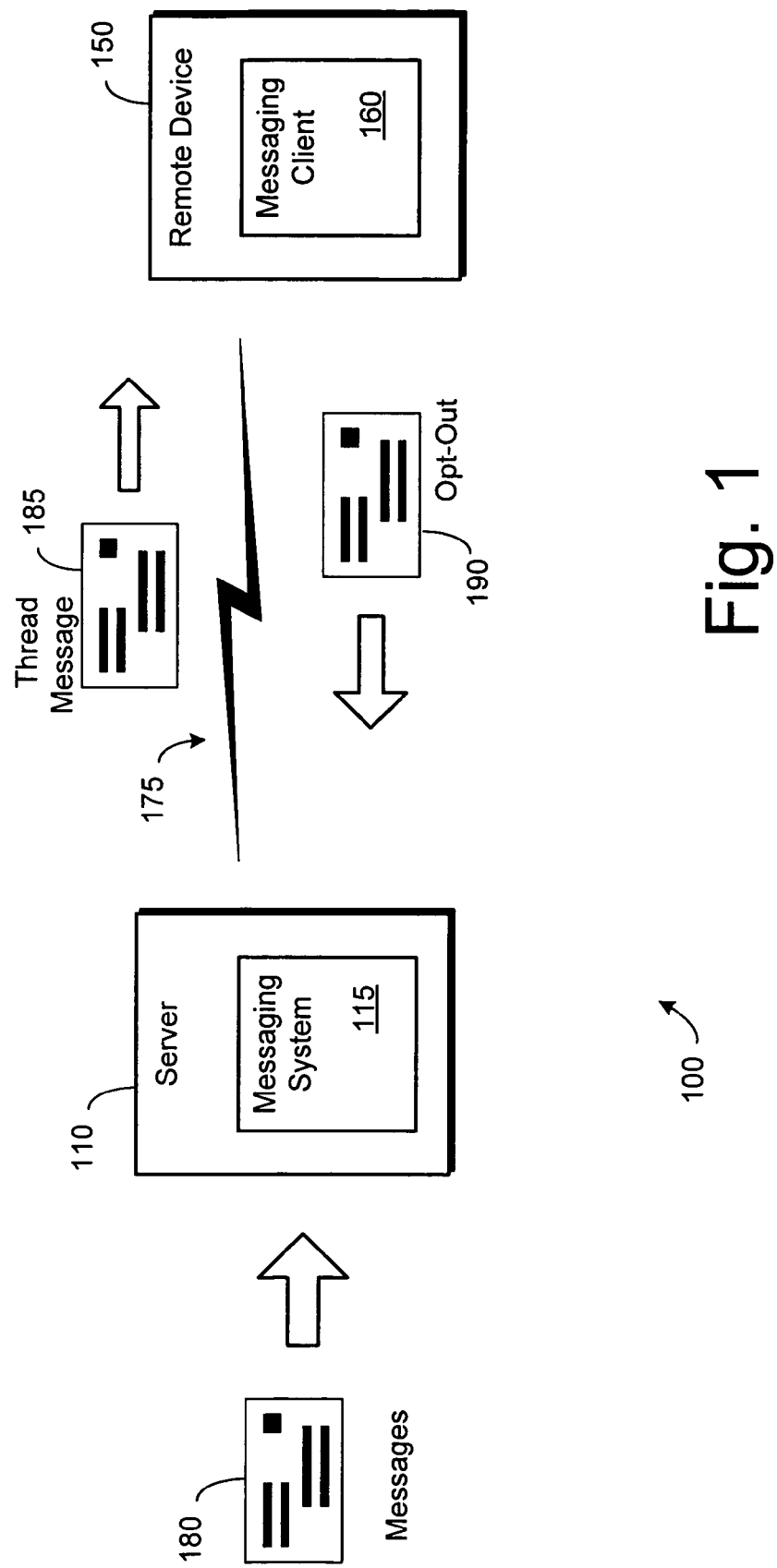
FIG. 1 is a functional block diagram generally illustrating a distributed messaging system for handling message threads, in accordance with one implementation of the invention.

FIG. 1 is a functional block diagram generally illustrating a system 100 for communicating messages from a server 110 to a remote device 150. The system 100 is only one example of how the inventive techniques and mechanisms may be implemented, and should not be considered exclusive of other implementations.

As illustrated, the system 100 includes a server 110 and a remote device 150 that communicate over a communications link 175. The server 110 may be any computing device configured to support the receipt of electronic messages 180 (e.g., e-mail) from various origins and directed at subscribers of a messaging system 115 resident at the server 110. Generally stated, the messaging system 115 is an application or applications configured to receive incoming messages 180 and to deliver them to the subscribers. In addition, the messaging system 115 is configured to perform thread handling operations, as described later.

The remote device 150 may be any device that presents computing functionality and communicates with the server 110 remotely over the communications link 175. Examples of the remote device 150 include a cellular telephone or personal digital assistant with integrated messaging capabilities, a laptop or notebook computer, a desktop computer, or any other computing device. The remote device 150 includes a messaging client 160 that interacts with the messaging system 115 on the server 110 to perform messaging functions as well as thread handling functions.

As mentioned, the two systems communicate over a communications link 175, which may be wired or wireless. Although only the server 110 and the remote device 150 are illustrated in the figures, it will be appreciated that many other components may be necessary to facilitate the communication link 175 between the server 110 and the remote device 150, such as radio frequency transmitters and receivers, cellular towers, and the like.

The server 110 and the remote device 150 may communicate using an ordinary messaging protocol, such as Post Office Protocol (POP), Simple Message Transfer Protocol (SMTP), Internet Message Access Protocol (IMAP), Multimedia Messaging Service (MMS), or the like. Alternatively, the two systems may communicate using an instant messaging service based on the Session Initiated Protocol or the like.

The remote device 150 may initiate requests to learn of new messages at the server 110, or the remote device 150 may be configured to accept asynchronous notifications of new messages from the server 110. In addition, the remote device 150 and the server 110 may be configured such that the remote device 150 requests delivery of specific messages it has been notified about, or all messages, or possibly all messages meeting some criteria, such as being new, below a certain size, and so forth. The remote device 150 and the server 110 may also be configured such that messages are asynchronously delivered to the remote device 150.

Figure 3:
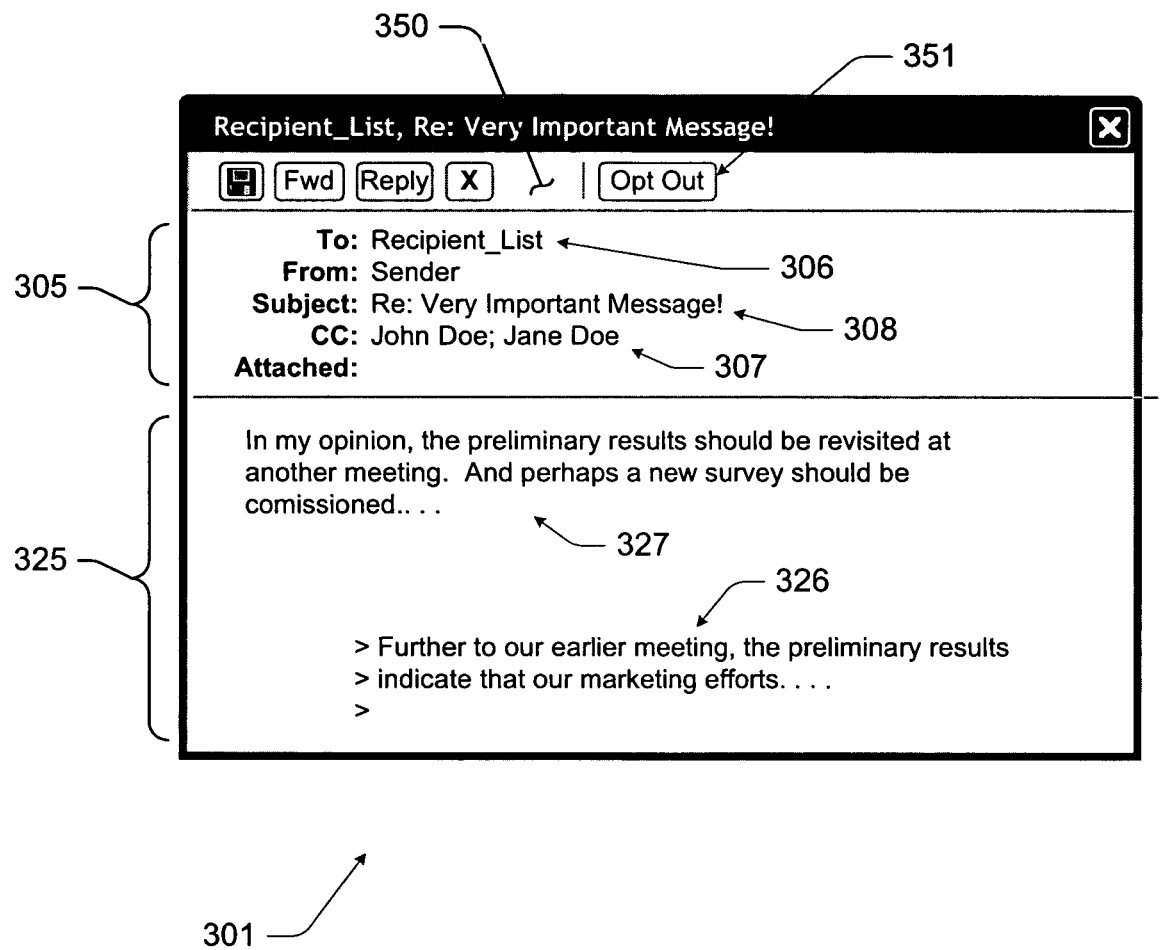
FIG. 3 is a graphical illustration of one example of a thread message as it may be displayed by the system illustrated in FIGS. 1 and 2.

In operation, incoming messages 180 are received at the server 110 by the messaging system 115. Initially, some or all of those messages 180 are delivered to the messaging client 160 on the remote device 150. To illustrate the inventive techniques, at least one of the incoming messages 180 is a thread message 185, which is delivered to the message client 160. As mentioned above, the thread message 185 is not necessarily of a different form than other messages, but rather may be simply a second or third reply to an initial message. The thread message 185 may be addressed to multiple recipients, including the user of the remote device 150. One example of a common thread message is illustrated in FIG. 3 and described below.

At the message client 160, the thread message 185 is received and presented to the user of the remote device 150. The user, if desired, causes the messaging client 160 to return an opt out message 190 to the server 110. The opt out message 190 indicates the user's desire to be excluded from subsequent messages in the same thread as the thread message 185. The messaging system 115 stores notice of the opt out message 190, and excludes the messaging client 160 from subsequent messages in the same thread as the thread message 185.

This technology enables the user of the remote device 150 to exclude himself from particular message threads without preventing the delivery of messages satisfying some more general criteria, such as any messages from a particular sender, any messages not directed specifically at the user (e.g., "cc:" messages), or the like. More specifically, the user need not create or manipulate any special message filtering rules to exclude a particular message thread. Nor does the user necessarily need to communicate with any one or more of the message thread recipients or senders to exclude the thread. In these and other ways, the technology described here improves over existing technology.

Figure 2:
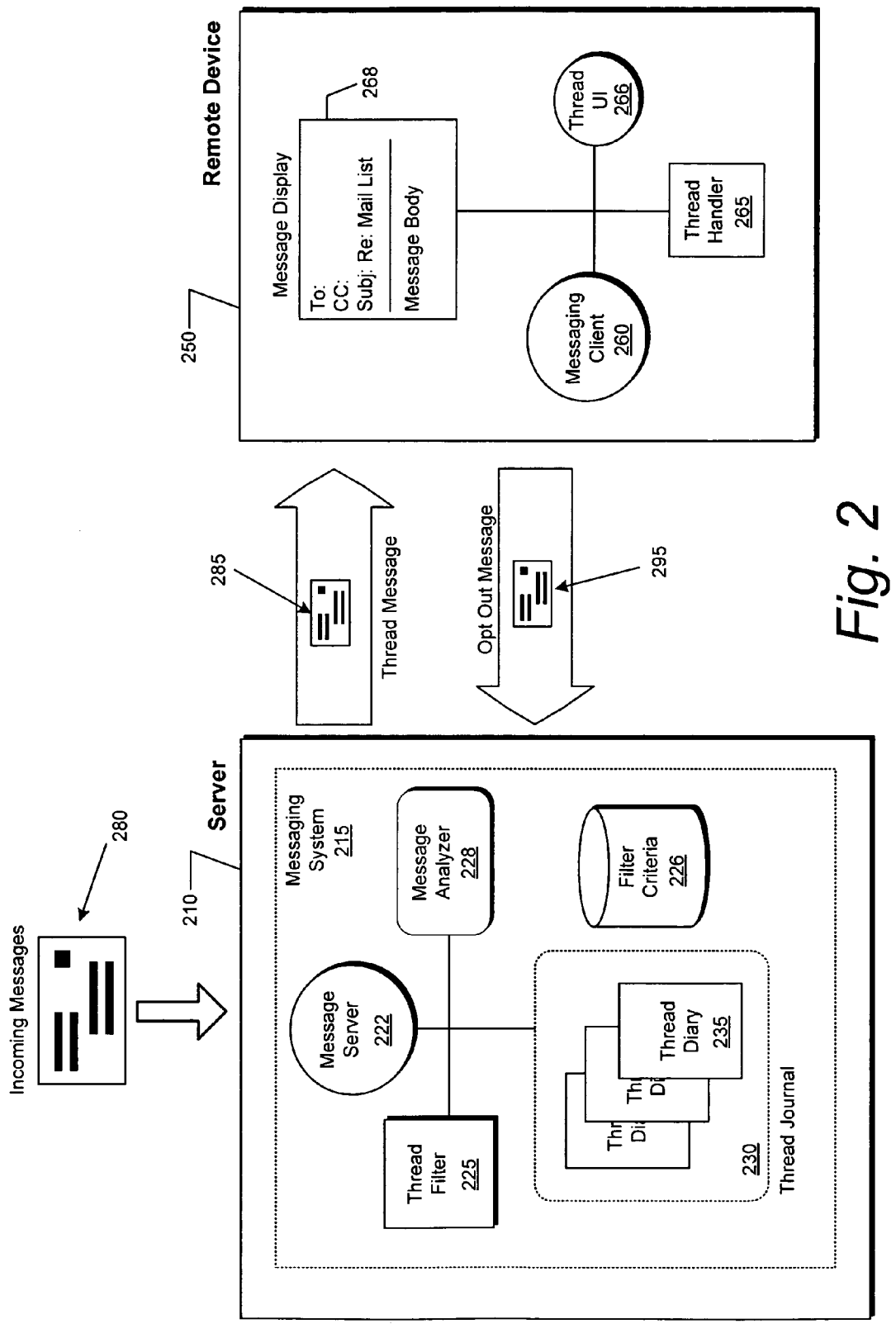
FIG. 2 is a functional block diagram generally illustrating in greater detail the messaging system illustrated in FIG. 1.

FIG. 2 is a functional block diagram illustrating in greater detail components of the system 100 shown in FIG. 1. In this implementation, the messaging system 215 on the server 210 includes a message server 222 configured to receive incoming messages 280 and to deliver some or all of those messages, such as thread message 285, to the remote device 250. The message server 222 may be a POP/SMTP, IMAP/SMTP, and/or MMS server for example. The message server 222 interacts with a message client 260 on the remote device 250 to make messages available to the remote device 250 and to receive other messages from the remote device 250 for outbound transmission. The message server 222 may communicate with or be integrated into other components of the server 210.

The messaging system 215 also includes a thread filter 225 that manages the thread handling operations performed at the server 210, and a message analyzer 228 that analyzes messages to determine if they constitute thread messages. Generally stated, the thread filter 225 and the message server 222 interact to determine if any of the incoming messages 280 have already been identified as a thread of interest, meaning a thread which at least one user has opted out of. The thread filter 225 maintains a thread journal 230 that identifies any such threads of interest. The thread filter 225 uses the message analyzer 228 to analyze messages for characteristic information in order to create entries in the thread journal (called thread diaries 235) and to determine if new messages are within a thread of interest.

The remote device 250 includes a message client 260 that performs the ordinary functions of receiving incoming messages from the server 210 and presenting those messages to the user. The message client 260 also allows the user to compose new or reply messages, and to return those new or reply messages to the server 210 for outbound transmission. The message client 260 and the message server 222 are also configured to exchange administrative messages or instructions that are not intended for delivery outside the messaging system 215.

The remote device 250 also includes a thread handler 265 that manages thread handling operations performed at the remote device 250, and a thread User Interface (UI) element 266 that provides the user with a mechanism for opting out of a particular thread. Generally stated, the message client 260 receives new messages and displays them for the user. The thread handler 265 causes the message client 260 to return an opt out message 295 if the user demonstrates a desire to cease receiving messages in a particular thread. The thread UI 266 enables the user to demonstrate that desire to the thread handler 265.

In operation, incoming messages 280 are received at the server 210 by the message server 222. The thread filter 225 invokes the message analyzer 228 to determine if any of the incoming messages 280 are thread messages. The message analyzer 228 makes this determination by comparing certain characteristics of the incoming messages 280 against stored identifiers for threads of interest, meaning threads for which the user has already indicated a subscription preference. In this implementation, each thread of interest has a corresponding thread diary 235, and the identifiers are stored in that thread diary 235. The characteristics may include the text of the subject line in an e-mail message, portions of the body of the message, or other characteristics of the incoming messages 280. Any incoming messages 280 identified as belonging to a thread of interest are handled as described later.

In the case where the incoming messages 280 do not include a message belonging to a thread of interest, the messages are delivered to the remote device 250, including the thread message 285. Assume that the user has not yet demonstrated a desire to be removed from the thread to which the thread message 285 belongs. It should be noted here that other mechanisms may be in place to limit the quality or quantity of the incoming messages that are delivered. For example, some incoming messages 280 may not be delivered because they are identified as spam, fail some rules-based analysis, or any other arbitrary reason as may be defined in some filter criteria 226. But those other mechanisms are outside the scope of this discussion and will not be discussed further.

At the remote device 250, the message client 260 receives the thread message 285 and displays it for the user (displayed message 268). The thread UI 266 is presented with the displayed message 268 in case the user desires to be removed from the thread. One example of the displayed message 268 with the thread UI 266 is presented in FIG. 3 and described later. In the current example, the user indicates that desire by activating the thread UI 266, which in turn causes the thread handler 265 to generate the opt out message 295. The message client 260 then returns the opt out message 295 to the message server 222.

The opt out message 295 is a special message that indicates the user's desire to opt out of the thread. The opt out message 295 includes characteristic information about the thread message 285 that can be used to identify subsequent messages in the same thread. For example, the characteristic information may include the entire thread message 285, the subject line of the thread message 285, portions of the body, the recipient list, header or other protocol information, or the like. Alternatively, an identifier for the thread message 285 may be used in cases where messages are stored at the server 210. The characteristic information may be included as a part of the opt out message 295 content, or it may be included as an attachment.

Figure 4:
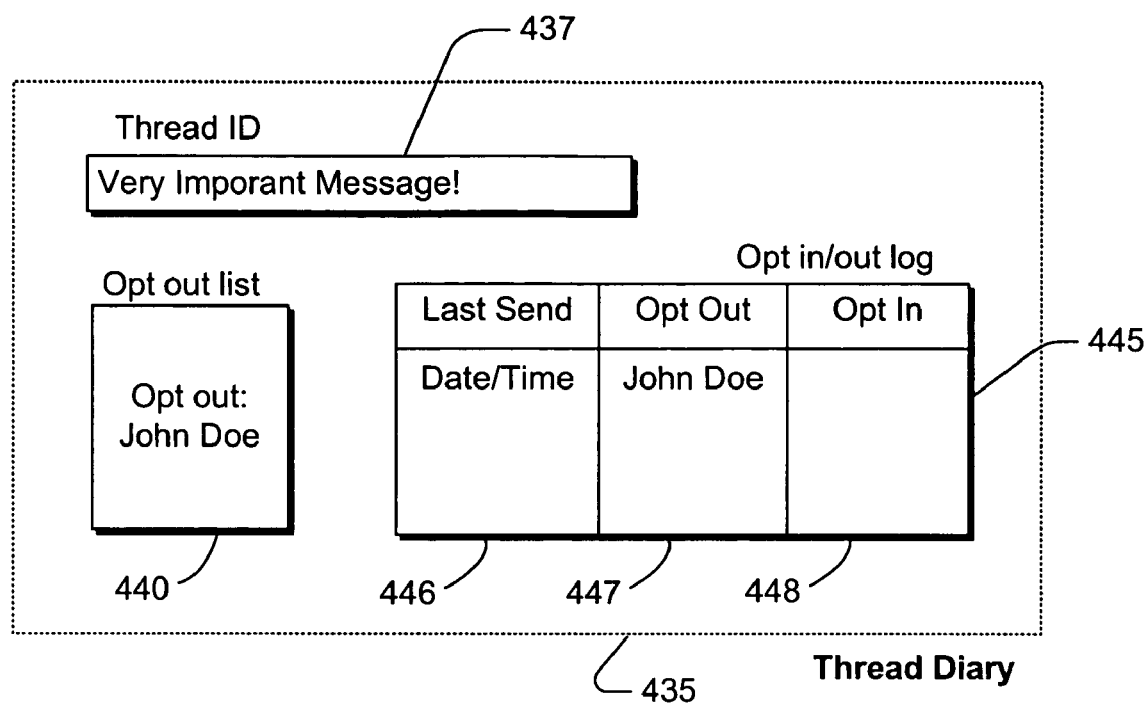
FIG. 4 is functional block diagram illustrating in greater detail a thread diary, such as that introduced in conjunction with FIG. 2.

Once the opt out message 295 is received at the server 210, the message server 222 passes it to the thread filter 225 for handling. In response, the thread filter 225, possibly in cooperation with the message analyzer 228, implements mechanisms to exclude the user from subsequent messages in the thread to which the thread message 285 (identified in the opt out message 295) belongs. More specifically, in this implementation, the thread filter 225 creates a thread diary 235 to indicate that at least one recipient has requested to be excluded from the thread. A sample thread diary 235 is illustrated in FIG. 4 and described below. Briefly stated, each thread diary 235 includes information for use in determining if subsequent incoming messages 280 are in the thread, and a list of those users that have opted out of the thread. In this particular implementation, there is one thread diary 235 for each thread having an opted-out user.

The thread filter 225 uses the message analyzer 228 to create thread-identification information for inclusion in the thread diary 235. It is envisioned that the characteristic information from the opt out message 295 will be used to create the thread-identification information. Thus, the thread-identification information simply may be the characteristic information from the opt out message 295. For example, the characteristic information may be the subject line of the thread message 285, and that may be used to identify the thread. Alternatively, the characteristic information may only provide the message analyzer 228 with enough information about the thread message 285 that test criteria can be created and used to evaluate the incoming messages 280.

The thread diary 235 also includes a list of those users that have elected to cease receiving messages in that thread. Accordingly, when the thread diary 235 is created the user that caused the thread diary 235 to be created may be the only user identified. Any subsequent users that opt out of the same thread can be added to the same thread diary 235.

As new messages are received at the message server 222, the thread filter 225 causes those messages to be evaluated by the message analyzer 228, which compares each incoming message to the thread-identification information in each thread diary 235 in the thread journal 230. In the case of a match, the thread filter 225 determines whether any of the users identified in the thread diary is included in the recipient list of the incoming message. If so, that user is removed from the recipient list and will not receive subsequent messages in the thread.

FIG. 3 is a graphical illustration of one example of a thread message 301 as it may be displayed by the system described above. The thread message 301 appears basically as an ordinary e-mail message displayed by an e-mail client. Other forms of electronic messages may differ in detail from the illustration in FIG. 3, but general features are common.

The thread message 301 includes a header 305 and a body 325. In this example, the header 305 includes two portions that identify recipients: a "To:" list 306 and a "CC:" list 307. As illustrated, the recipients of the thread message 301 include those users identified by "Recipient_List," "John Doe," and "Jane Doe." It will be appreciated that the term Recipient_List refers to a list of individual recipients rather than to specific recipients. Thread messages are commonly addressed to recipient lists that include multiple individuals. However, it is also common for a thread message to be individually addressed to multiple recipients, or some combination as is the case with thread message 301.

The body 325 of thread message 301 includes an original message portion 326 and a reply portion 327. Generally speaking, the original message portion 326 is contained in the original message that initiated the thread, and the reply message 327 is added to the message in reply to the original message 326, thus beginning the thread. With each subsequent reply, the body 325 usually changes when another reply portion 327 is added by each subsequent respondent. These parts of the body 325 are illustrated simply to demonstrate characteristics that often appear in thread messages, and are not necessary to the invention.

The thread message 301 also includes a subject line 308 that may contain text. Typically the subject line 308 includes a brief message that summarizes or introduces the content of the body 325. Generally speaking, the subject line 308 does not change unpredictably with each subsequent reply. However, it is common to prepend a predictable text string to the subject line 308 to indicate that the subsequent message is a reply or forward. Commonly, the term "Re:" is used to indicate a reply and the term "Fw:" is used to indicate a forward.

The thread message 301 is displayed with a toolbar 350 that provides the user with operations that may be performed on the thread message 301 while viewing it. Examples of these operations include saving the message to a persistent location, forwarding the message to others, replying to the sender or to all the recipients, or deleting the message. In addition, the toolbar 350 of this implementation includes an opt out button 351, which represents a manifestation of the thread UI component 266 illustrated in FIG. 2. The opt out button 351 provides a simple mechanism for the user to indicate a desire to remove himself from the thread. Activating the opt out button 351 invokes the techniques described above for sending an opt out message. Although illustrated here as a toolbar button, it will be appreciated that the thread UI may be implemented in many other ways, such as a menu item or the like.

FIG. 4 is functional block diagram illustrating in greater detail a thread diary 435, such as that introduced in FIG. 2. As mentioned above, a thread diary is created for each thread out of which a user has opted. The thread diary 435 may be embodied in any appropriate form for storing data, such as a configuration file, binary data file, database, extensible Markup Language (XML) document, or the like.

The thread diary 435 includes a thread ID 437 that uniquely identifies the thread with which the thread diary 435 is associated. The thread ID 437 may be any unique identifier that can distinguish between threads. One simple example may be the text included in a subject line of the thread messages. Looking at the example thread message 301 described above, the thread ID 437 may be "Very Important Message!" Note that here the prefix "Re:" has been omitted from the text of the subject line, and only the consistent portion of the text is stored as the identifier. Eliminating prefixes added to replies and forwards is commonly performed, and helps to more accurately identify the thread.

Various other characteristic information about the thread message may also be used for the thread ID 437. For instance, portions of the body of the message, the names of one or more of the recipients of the message, the sender of the message, header or protocol information about the message, and the like (just to name a few) may also be used either alone or in any combination.

The thread diary 435 also includes an opt out list 440, which is a list of any users that have indicated a desire to be excluded from future messages in the thread. There are many different ways to identify users in the opt out list 440. In one example, the e-mail address or alias may be used to identify the users.

An opt in/out log 445 may be used to track those users that have been excluded from the delivery of any message within the thread. The opt in/out log 445 includes a plurality of records where each record is associated with a particular thread message that has either been received or delivered by the message server. Each record includes information about the users that opted out or in from the thread. More specifically, a last send field 446 is used to log the time at which a particular message in the thread is received or delivered. Optionally, some identifier for the particular message may be included as well. An opt out field 447 associated with the last send field 446 identifies any users that were omitted from the delivery of the message by virtue of having been on the opt out list 440 at the time the message was sent.

An opt in field 448 may be included to identify any users that have opted back in to receiving messages in the thread. In other words, as will be described in greater detail in conjunction with FIG. 8, a user that has opted out of a particular thread may later choose to rescind that option and resume receiving messages in the thread. Any such users may be identified in the opt in field 448 associated with the last send field 446.

The opt in/out log 445 may be included in the thread messages that are delivered to users so that the recipients will know which other users have not received a particular message in the thread.

Figure 5:
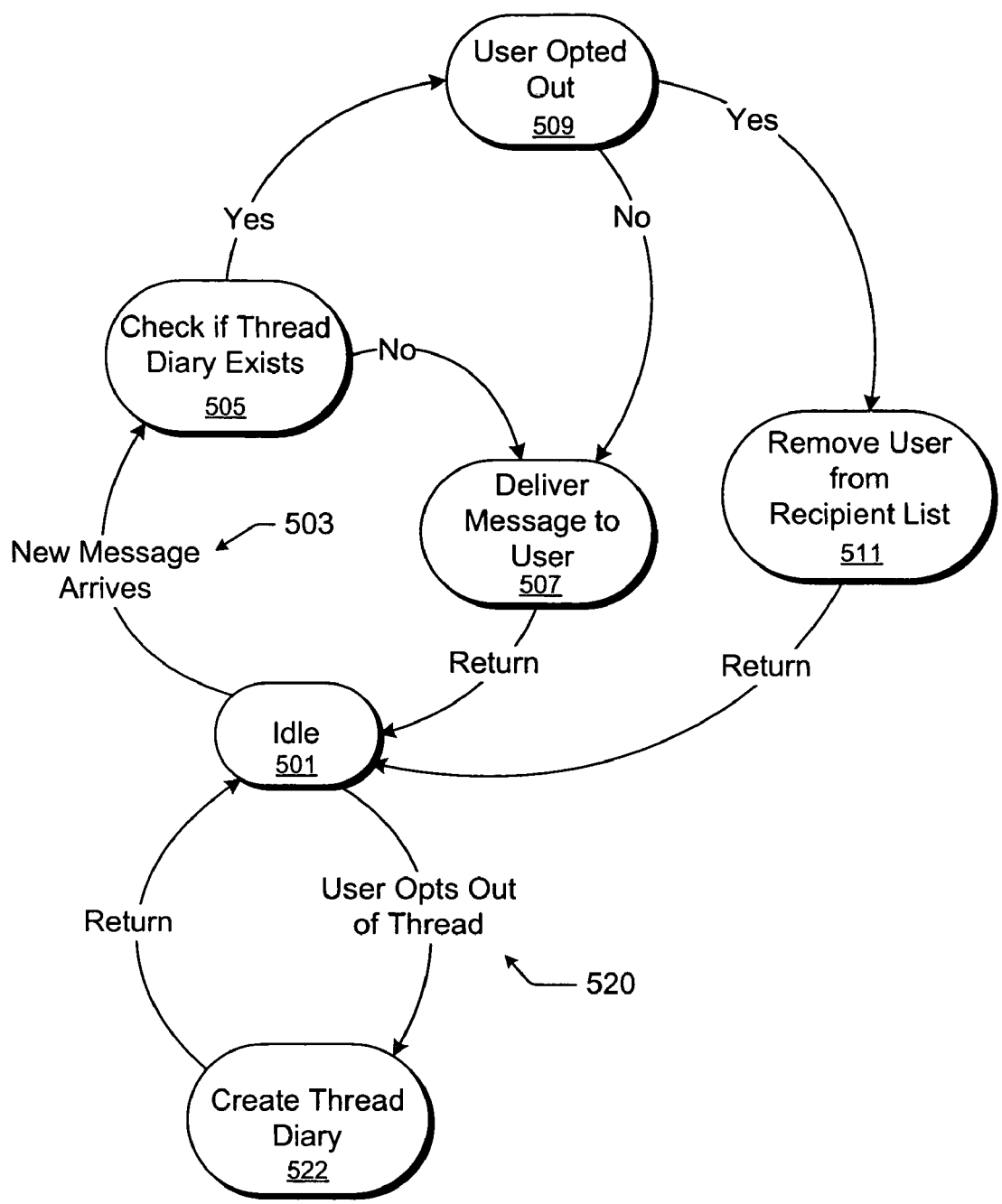
FIG. 5 is a an operational flow diagram generally illustrating operations that are performed at a server in response to the occurrence of certain thread-related events, in accordance with an implementation of the invention.

FIG. 5 is an operational flow diagram illustrating generally operations that are performed at a server in response to the occurrence of certain thread-related events. Initially, the server is in an idle state 501 awaiting the occurrence of an event. It should be noted that the idle state 501 does not necessarily suggest that the server is not performing any tasks, rather the idle state 501 only represents the steady state of the server while is not handling the events described here. Indeed, the server is likely to be performing very many tasks unrelated to message thread handling.

One event that may occur is that a new message may arrive at the server (new message event 503). In response to that event, the server checks to see if a thread diary exists that corresponds to the new message (operation 505). This operation my include comparing characteristic information about the new message with identification information stored in any existing thread diaries stored at the server. If there is not an existing thread diary that corresponds to the new message, then the message is delivered to the intended user (operation 507), and the server returns to the idle state 501.

If a thread diary does exist that corresponds to the new message, then a determination is made (operation 509) whether the user to which the new message is directed has opted out of the thread. If the user is identified in an opt out list within the thread diary, then that user is removed from the intended recipients of the new message (operation 511), and the server returns to the idle state 501. If, however, the user is not identified in the opt out list, then the message is delivered to that user (operation 507), and the server returns to the idle state 501. It should be noted that if a thread diary exists and the new message is delivered, an entry may be created in a log within the thread diary indicating that the message was delivered, as well as any other pertinent information.

Another event that may occur is that a notification to opt out of a thread may be received at the server from a user (opt out event 520). In response to that event, the server creates a data structure, or the like, to persist information that the server uses to remove the user from subsequent messages in the thread (operation 522). In the particular implementations described above, a thread diary is used to store that information. More specifically, the thread diary includes a unique identifier of the thread to which the user desires to opt out. That identifier may be created using characteristic information about the thread extracted from the notification that was received. The thread diary also includes a listing of any users that have opted out of a particular thread, and it may include other information such as a log of messages delivered or received in the thread and any users that were not delivered those messages. Once the data structure, or the like, is created, the server returns to the idle state 501.

Generalized Methods that Implement Aspects of the Invention

Figure 6:
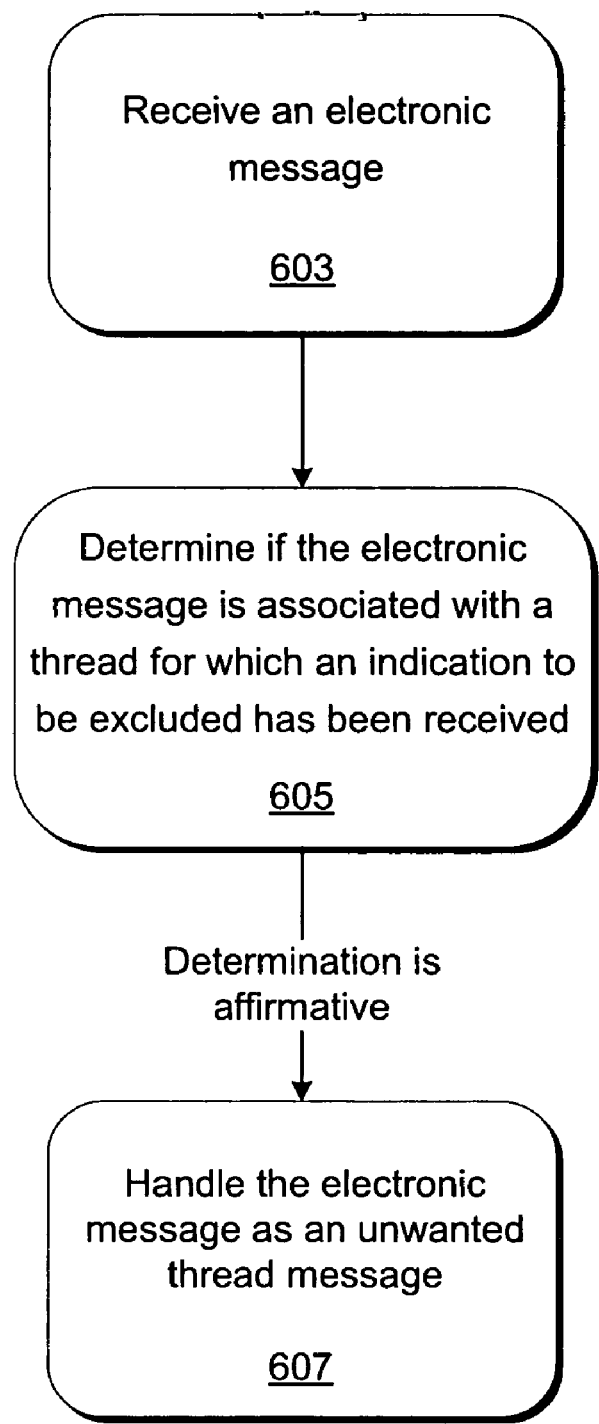
FIG. 6 is an operational flow diagram generally illustrating a message thread handling method that may be implemented by a server.

FIG. 6 is an operational flow diagram illustrating general steps that may be performed by a message thread handling method 600 that may be implemented by a server. The method 600 begins at step 603 where the server receives an electronic message. The electronic message may take one of many different forms, such as electronic mail or the like.

At step 605, the server determines if the electronic message is associated with a thread for which an indication to be excluded has been received. In specific implementations, the server may analyze the electronic message to determine if characteristics of the electronic message match stored information that identifies the thread. The stored information may include identification information for the thread, as well as a list of recipients that have opted out of the thread. If that determination is affirmative, the method proceeds to step 607.

At step 607, the electronic message is handled as an unwanted thread message. Because, at step 607, a recipient has indicated a desire to be excluded from the thread, the server does not simply deliver the electronic message as it would other ordinary messages. Rather, the electronic message is handled in some other fashion. In the simple case, the unwanted thread message may simply not be delivered to the recipient that has indicated a desire to opt out. In other instances, the unwanted thread message may be redirected to a special folder in which are stored messages for viewing separate from ordinary electronic messages. In yet another example, unwanted thread messages may simply be deleted.

Figure 7:
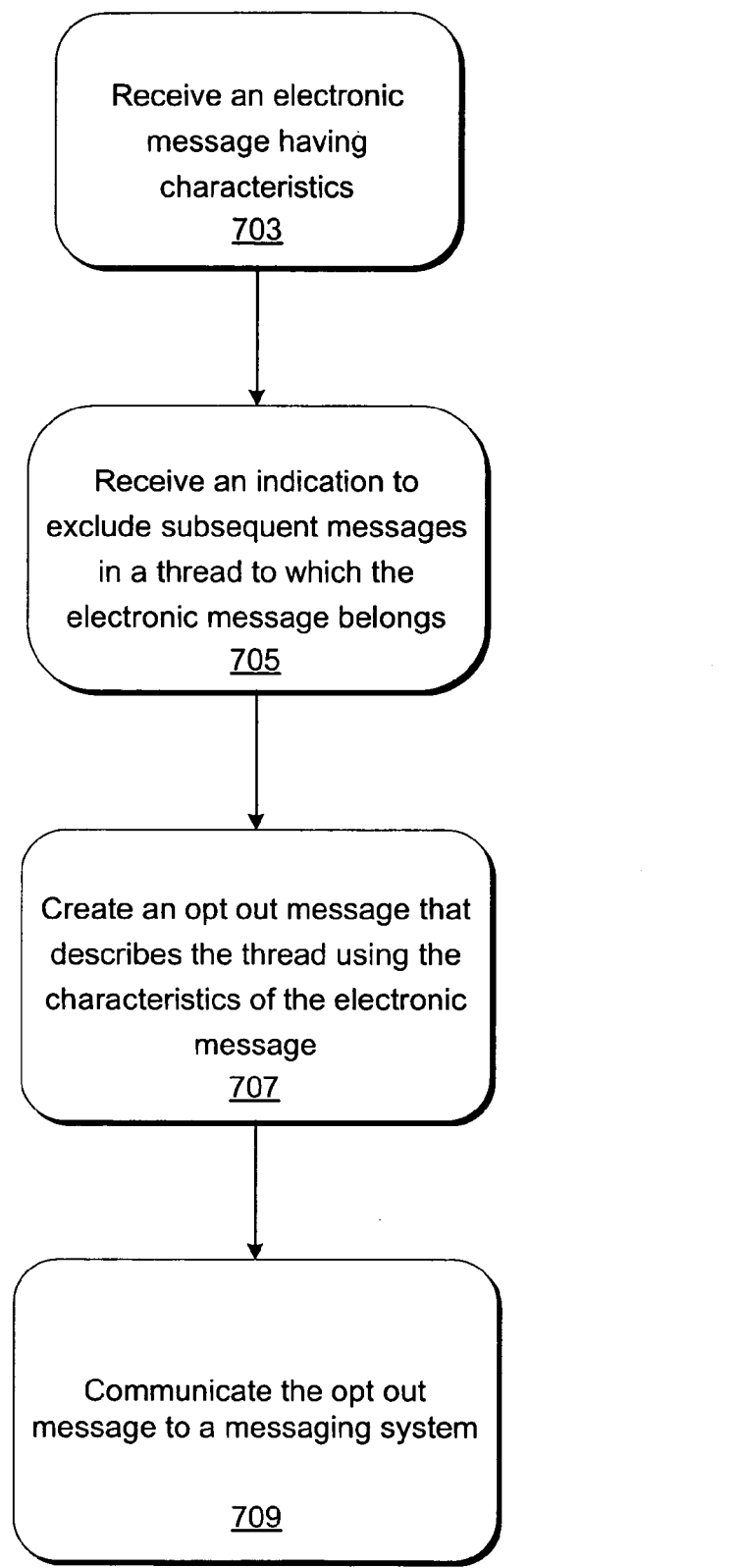
FIG. 7 is an operational flow diagram generally illustrating a message thread handling method that may be implemented by a remote client device.

FIG. 7 is an operational flow diagram illustrating general steps that may be performed by a message thread handling method 700 that may be implemented by a remote client device. At step 703, the client device receives an electronic message having characteristics, such as a subject line, header information, a body, and the like. The electronic message may be received from a message server, or the like.

At step 705, the client device receives an indication to exclude subsequent messages in a thread to which the electronic message belongs. In other words, a user of the client device may indicate a desire to cease receiving messages in the same thread as the received electronic message. That indication may be manifested at the client device through a user interface component or the like.

At step 707, the client device creates an opt out message that describes the thread using the characteristics of the electronic message. In one example, the characteristics of the electronic message may include text from a subject line or body of the electronic message. In another example the characteristics may include the entire electronic message. Those characteristics, together with the indication to opt out of the thread, are included in the opt out message.

At step 709, the client device communicates the opt out message to a messaging system. In one example, the messaging system resides on a server that is responsible for delivering electronic messages to the client device. In another example, the messaging system may reside on the client device itself. In either case, the messaging system is responsible for handling the subsequent electronic messages in the thread. In response to the opt out message, those subsequent electronic messages may be handled as unwanted electronic messages, which may result in them not being delivered to the client device.

IMPROVEMENTS AND ADDITIONAL EMBODIMENTS

The system described above may be further refined in many ways. For example, the above system envisions a distributed architecture where mechanisms on a server and a remote device interact to achieve the results described. This has the advantage that bandwidth is not unnecessarily being used to deliver messages to a user who has opted out of the thread. However, in another implementation, the entire system could be implemented at the remote device such that a messaging client at the remote device maintains information about which threads a user has opted out of. In one example, the user may indicate a desire to opt out of a thread while viewing a thread message, and the local messaging client could store that information on the remote device in a data structure similar to the thread diary described above. Any subsequent messages in the thread that arrive at the remote device may be automatically deleted, re-directed to a special storage location, specially flagged, or otherwise handled. While this alternative embodiment may not necessarily achieve the advantage of reduced bandwidth, it is a system that may be implemented at a local device without modifying the message server, which could be a consideration.

Another improvement is allowing the user to visit a special location in which thread messages are redirected if the user has opted out of the thread. In other words, rather than simply deleting a user from the recipient list of a thread message, the system could simply deliver the message to the special location for the user so that the user can examine thread messages at his leisure rather than in the ordinary course of message delivery. In one example, a special thread folder, or the like, in a message store on the server may be used to store such thread messages. The special thread folder may be accessible to the user through some out-of-band delivery mechanism, such as through a special Web interface or the like. Thus, the user can periodically examine the contents of that special thread folder to read thread messages at the user's leisure, rather than as each thread message is transmitted. This achieves the advantage that the user is no longer inconvenienced by unwanted thread messages that are received while the user may be busy or occupied, but the user can still go back and review those messages when the user has free time.

Still another improvement is allowing the user to opt back in to a thread. For instance, it is possible that a user who has opted out of a thread may later change his or her mind. The above system may be enhanced to accommodate those situations. One simple mechanism or technique for doing so is to allow thread diaries to expire after a predetermined amount of time. For example, the system may be configured such that thread diaries, or functionally comparable data structures, cease to exist or be effective after some period of time, such as a week. In this way, any thread messages that are received more than a week from when a corresponding thread diary is created will be delivered to a user that has opted out of the thread. Given that more than a single user may opt out of a single thread, the thread diary may either expire at the same time for all users, or it may simply cease to be effective for any unsubscribed users based on the time at which those users unsubscribed. Other nuances on this core concept will become apparent to those skilled in the art.

Figure 8:
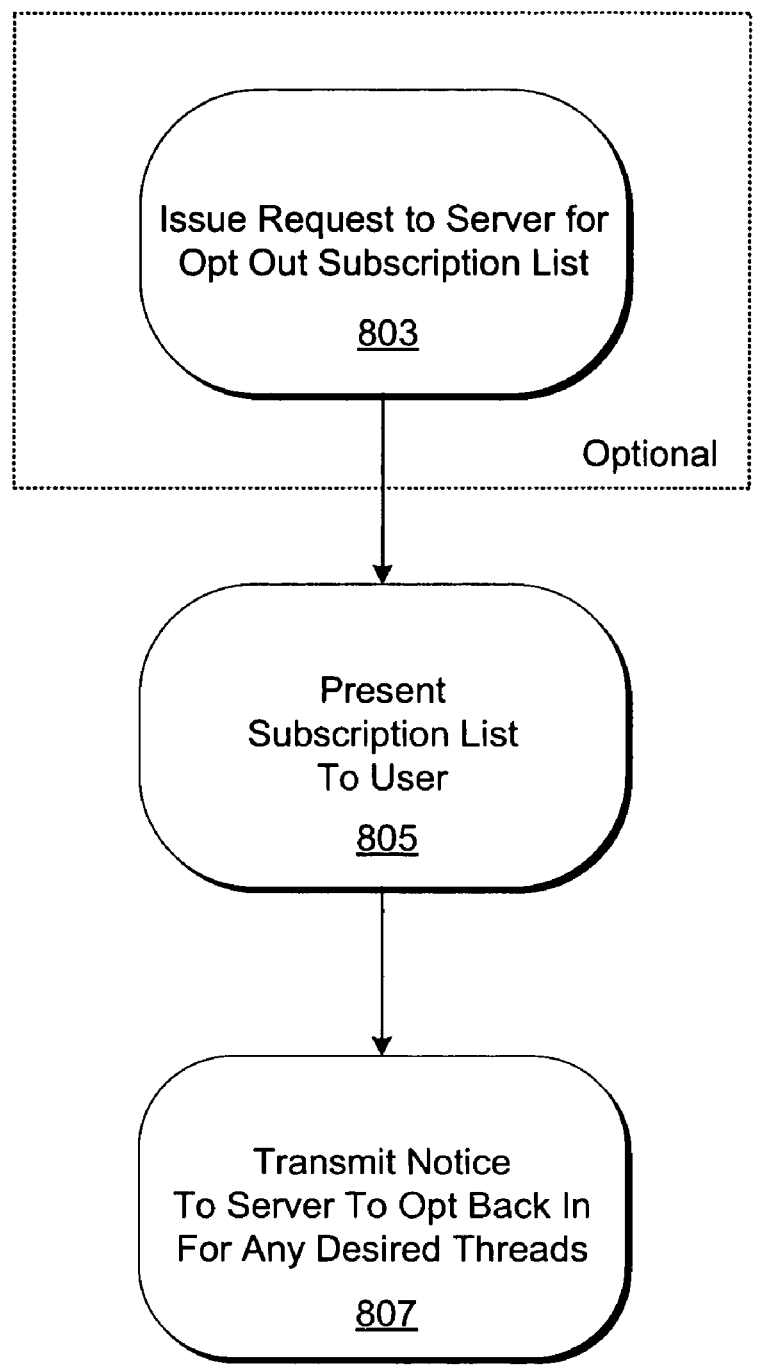
FIG. 8 is an operational flow diagram generally illustrating one illustrative approach for allowing a user to opt back in to a thread, in accordance with one implementation of the invention.

In yet another embodiment, a more interactive approach to opting back in to a thread could be implemented. FIG. 8 is an operational flow diagram generally illustrating one such approach. To begin, a user causes a remote device to issue a request to a server for a subscription list that identifies any threads out of which the user has opted (operation 803). The subscription list includes an identifier or characteristic information about any such threads, and may include other information such as how many messages the user has missed, or the like. As an alternative, the remote device could maintain the subscription list so that a request to the server is not necessary to acquire the information, thus rendering operation 803 optional. As another alternative, the subscription list may be periodically transmitted by the server to any users that have opted out of threads, thus eliminating the need for the user to initiate the operation.

At operation 805, the subscription list is presented to the user to allow the user to identify any threads into which the user desires to opt back in. As mentioned, the subscription list may include any manner of identifier for the threads to which the user has opted out. Those identifiers may be presented to the user in such a manner that the user can select one or more and cause to be issued another message requesting to opt back in to those threads (operation 807). In one example, the presentation may take the form of a series of individual e-mail messages with each message corresponding to a thread out of which the user has opted. The user may indicate a desire to opt back in to a thread by replying directly to any one of the messages that identifies that particular thread. Alternatively, the user may be presented with a single display that includes all of the opted-out threads, and the user may individually select any one or more directly from the presentation user interface.

The several mechanisms and techniques for message thread handling described above are beneficial to consumers because they avoid the wasted time spent reading unwanted threads. Moreover, the intrusion or disruption of simply receiving messages that are unwanted is avoided. In addition, network delays and congestions can be reduced by eliminating the delivery of unwanted messages.

While the present invention has been described with reference to particular embodiments and implementations, it should be understood that these are illustrative only, and that the scope of the invention is not limited to these embodiments. Many variations, modifications, additions and improvements to the embodiments described above are possible. For example, a further embodiment may include a computer-readable medium having computer executable instructions for message thread handling. It is contemplated that these variations, modifications, additions and improvements fall within the scope of the invention as detailed within the following claims.

I claim:

1. A method for message thread handling, the method comprising:
    receiving, at a server, an electronic message;
    analyzing the electronic message to determine if the electronic message is associated with an electronic message thread for which an indication to be excluded has been received from at least one recipient; and
    if the determination is affirmative,
        handling the electronic message as an unwanted thread message, and
        delivering a log tracking the at least one recipient requesting to be excluded from the electronic message thread to other recipients of the electronic message associated with the electronic message thread.

2. The method recited in claim 1, wherein the electronic message includes characteristic information and wherein analyzing the electronic message comprises comparing the characteristic information to stored identification information that identifies the electronic message thread.

3. The method recited in claim 1, wherein the indication to be excluded from the electronic message thread is indicated by issuing an opt out message to a messaging system that includes identification information about the electronic message thread.

4. The method recited in claim 3, wherein the messaging system resides on a client computing system on which messages are displayed.

5. The method recited in claim 1, wherein handling the unwanted thread message comprises a selected one or more of not delivering the unwanted thread message to a client computing system unless specially requested by the client computing system, redirecting the unwanted thread message to a special folder in which are stored messages for viewing separate from other electronic messages, and deleting the unwanted thread message.

6. The method recited in claim 1, further comprising:
    receiving an opt in notification that rescinds the indication to be excluded from the electronic message thread; and
    in response, handling a subsequent electronic message in the electronic message thread as an ordinary electronic message.

7. The method recited in claim 6, wherein the opt in notification comprises an expiration of a predetermined time period.

8. The method recited in claim 6, wherein the opt in notification comprises an electronic message communicating the desire to be included in the electronic message thread.

9. A method for message thread handling, the method comprising:
    receiving, at a client device, an electronic message having characteristics;
    receiving an indication to exclude subsequent messages in an electronic message thread to which the electronic message belongs;
    creating an opt out message that describes the electronic message thread using the characteristics of the electronic message; and
    communicating the opt out message to a messaging system, the messaging system being operative to handle the subsequent messages in the electronic message thread,
    wherein a log tracking the client device opting out of the electronic message thread is delivered to other client devices receiving the subsequent messages in the electronic message thread.

10. The method recited in claim 9, wherein the characteristics comprise textual data in a portion of the electronic message.

11. The method recited in claim 9, wherein communicating the opt out message comprises delivering the opt out message to a messaging system separate from the client device.

12. The method recited in claim 9, wherein communicating the opt out message comprises delivering the opt out message to a messaging system resident on the client device.

13. The method recited in claim 9, further comprising issuing a notice to the messaging system to cease excluding the subsequent messages in the electronic message thread.

14. In a system having a server and a client, a method for message thread handling, comprising:
    delivering an electronic message from the server to the client;
    displaying the electronic message at the client;
    receiving at the client an indication to cease receiving subsequent electronic messages in an electronic message thread to which the electronic message belongs;
    communicating the indication from the server to the client;

creating, at the server, an electronic message thread diary to indicate that at least one recipient has requested to be excluded from the electronic message thread to which the electronic message belongs, the electronic message thread diary configured to include a log listing the at least one recipient requesting to be excluded from the electronic message thread;

receiving, at the server, a subsequent electronic message;

determining, from the electronic message thread diary, that the subsequent electronic message belongs to the electronic message thread;

handling the subsequent electronic message as an unwanted thread message; and delivering the log to other recipients of the subsequent electronic message in the electronic message thread.

15. The method recited in claim 14, wherein the electronic message has characteristics, and creating the electronic message thread diary comprises creating an electronic message thread identification based on the characteristics of the electronic message.

16. The method recited in claim 14, wherein communicating the indication comprises creating an opt out message that describes the electronic message thread using characteristics of the electronic message and includes a notice to exclude subsequent messages in the electronic message thread, and delivering the opt out message to the server.

17. The method recited in claim 14, further comprising:

receiving, at the server, an opt in notification that rescinds the indication to cease receiving subsequent electronic messages in the electronic message thread; and in response, handling a subsequent electronic message in the electronic message thread as an ordinary electronic message.

18. A computer-readable medium comprising instructions, which, when executed by a computer, cause the computer to perform operations, the instructions comprising:

at least one instruction for receiving an electronic message at a message server, the electronic message having characteristics;

at least one instruction for comparing the characteristics of the electronic message to identification information stored at the message server to determine if the electronic message is associated with an electronic message thread for which an indication to be excluded has been received from at least one recipient; and if the determination is affirmative, at least one instruction for handling the electronic message as an unwanted thread message; and at least one instruction for delivering a log tracking the at least one recipient requesting to be excluded from the electronic message thread to other recipients of the electronic message associated with the electronic message thread.

19. The computer-readable medium recited in claim 18, wherein the at least one instruction for handling the unwanted thread message comprises a selected one or more instructions from a list of instructions that includes at least one instruction for not delivering the unwanted thread message to a client computing system unless specially requested by the client computing system, at least one instruction for redirecting the unwanted thread message to a special folder in which are stored messages for viewing separate from other electronic messages, and at least one instruction for deleting the unwanted thread message.

20. The computer-readable medium recited in claim 18, wherein the instructions further comprise:

at least one instruction for receiving an opt in notification that rescinds the indication to be excluded from the electronic message thread; and in response, at least one instruction for handling a subsequent electronic message in the electronic message thread as an ordinary electronic message.

21. The computer-readable medium recited in claim 20, wherein the opt in notification comprises an expiration of a predetermined time period.

22. The computer-readable medium recited in claim 20, wherein the opt in notification comprises an electronic message communicating a desire to be included in the electronic message thread.

23. A computer-readable medium comprising instructions, which, when executed by a computer, cause the computer to perform operations, the instructions comprising:

at least one instruction for receiving, at a client device, an electronic message having characteristics;

at least one instruction for receiving an indication to exclude subsequent messages in an electronic message thread to which the electronic message belongs;

at least one instruction for creating an opt out message that describes the electronic message thread using the characteristics of the electronic message; and at least one instruction for communicating the opt out message to a messaging system, the messaging system being operative to handle the subsequent messages in the electronic message thread, wherein a log tracking the client device opting out of the electronic message thread is delivered to other client devices receiving the subsequent messages in the electronic message thread.

24. The computer-readable medium recited in claim 23, wherein at least one instruction for communicating the opt out message comprises at least one instruction for delivering the opt out message to a messaging system resident on the client device.

25. The computer-readable medium recited in claim 23, further comprising at least one instruction for issuing a notice to the messaging system to cease excluding the subsequent messages in the electronic message thread.

26. A computer-readable medium comprising instructions, which, when executed by a computer, cause the computer to perform operations, the instructions comprising:

at least one instruction for delivering an electronic message from a server to a client;

at least one instruction for displaying the electronic message at the client;

at least one instruction for receiving at the client an indication to cease receiving subsequent electronic messages in an electronic message thread to which the electronic message belongs;

at least one instruction for communicating the indication from the server to the client;

at least one instruction for creating, at the server, an electronic message thread diary to indicate that at least one recipient has requested to be excluded from the electronic message thread to which the electronic message belongs, the electronic message thread diary configured to include a log tracking the at least one recipient requesting to be excluded from the electronic message thread;

at least one instruction for receiving, at the server, a subsequent electronic message;

at least one instruction for determining, from the electronic message thread diary, that the subsequent electronic message belongs to the electronic message thread;

at least one instruction for handling the subsequent electronic message as an unwanted thread message; and at least one instruction for delivering the log to other recipients of the subsequent electronic message in the electronic message thread.

27. The computer-readable medium recited in claim 26, wherein the at least one instruction for communicating the indication comprises at least one instruction for creating an opt out message that describes the electronic message thread using characteristics of the electronic message and includes a notice to exclude subsequent messages in the electronic message thread, and at least one instruction for delivering the opt out message to the server.

28. The computer-readable medium recited in claim 26, wherein the at least one instruction for handling the unwanted thread message comprises a selected one or more of at least one instruction for not delivering the unwanted thread message to a client computing system unless specially requested by the client computing system, at least one instruction for redirecting the unwanted thread message to a special folder in which are stored messages for viewing separate from other electronic messages, or at least one instruction for deleting the unwanted thread message.

29. The computer-readable medium recited in claim 26, further comprising:

at least one instruction for receiving, at the server, an opt in notification that rescinds the indication to cease receiving subsequent electronic messages in the electronic message thread; and in response, at least one instruction for handling a subsequent electronic message in the electronic message thread as an ordinary electronic message.

30. A server for message thread handling, comprising:

a message receiving component configured to receive inbound electronic messages;

a message transmitting component configured to transmit outbound electronic messages; and a processing unit programmed to:

identify unwanted thread messages by comparing inbound electronic messages to stored identification information that identifies an electronic message thread for which an indication to exclude a recipient has been received, remove the recipient from a recipient list for the unwanted thread message, and deliver a log tracking the recipient requesting to be excluded from the recipient list for the unwanted thread message to other recipients in the recipient list for the unwanted thread message.

31. The server recited in claim 30, wherein:

the stored identification information further comprises an electronic message thread diary that includes identification information that identifies the electronic message thread, the electronic message thread diary further including a list of recipients that have requested to be excluded from the electronic message thread; and wherein the processing unit is further programmed to analyze an inbound electronic message to determine if the inbound electronic message is within the electronic message thread by comparing characteristics of the inbound electronic message to the identification information in the electronic message thread diary, the processing unit being further programmed to create the electronic message thread diary in response to a request to be excluded from the electronic message thread.

32. The server recited in claim 31, wherein the processing unit is further programmed to add additional names of recipients to an exclusion list within the electronic message thread diary upon receiving another request to be excluded from the electronic message thread.

33. The server recited in claim 32, wherein the processing unit is further programmed to remove names of recipients from the exclusion list within the electronic message thread diary upon receiving a request associated with such recipient to be included in the electronic message thread.

34. A client computing device, comprising:

a message receiving component configured to receive inbound electronic messages;

a message transmitting component configured to transmit outbound electronic messages; and a processing unit programmed to:

display an inbound electronic message received by the message receiving component, create an opt out message in response to an indication, by a recipient, to exclude subsequent inbound electronic messages in an electronic message thread to which the inbound electronic message belongs, and cause the message transmitting component to deliver the opt out message to a message server, wherein a log tracking the recipient requested to be excluded from the subsequent inbound electronic messages in the electronic message thread is delivered to other recipients of the subsequent inbound electronic messages in the electronic message thread.

35. The client computing device recited in claim 34, wherein the processing unit is further programmed with an electronic message thread UI component configured to receive the indication to exclude subsequent inbound electronic messages from the electronic message thread.

36. The client computing device recited in claim 35, wherein the electronic message thread UI component comprises a user interface element displayed in conjunction with the inbound electronic message.

37. The client computing device recited in claim 36, wherein the user interface element comprises a toolbar button.

38. The client computing device recited in claim 34, wherein the processing unit is further configured to evaluate the inbound electronic message to determine characteristic information about the inbound electronic message, and to include the characteristic information in the opt out message.

39. A system for message thread handling, comprising:

a server including:

a server message receiving component configured to receive inbound electronic messages;

a message transmitting component configured to transmit outbound electronic messages; and a server processing unit programmed to:

identify unwanted thread messages by comparing inbound electronic messages to stored identification information that identifies an electronic message thread for which an indication to exclude a recipient has been received, remove the recipient from a recipient list for the unwanted thread message, and deliver a log tracking the recipient requesting to be excluded from the recipient list for the unwanted thread message to other recipients in the recipient list for the unwanted thread message; and a client computing device including:

a client message receiving component configured to receive inbound electronic messages from the server;

a client message transmitting component configured to deliver outbound electronic messages to the server; and a client processing unit programmed to:
  display an inbound electronic message received by the client message receiving component,
  create an opt out message that includes the indication to exclude subsequent inbound electronic messages in the electronic message thread, and
  cause the client message transmitting component to deliver the opt out message to the server.

40. A server for message thread handling, comprising:
means for receiving inbound electronic messages;
means for transmitting outbound electronic messages;
means for identifying unwanted thread messages by comparing inbound electronic messages to stored identification information that identifies an electronic message thread for which an indication to exclude a recipient has been received;
means for removing the recipient from a recipient list for the unwanted thread message; and
means for delivering a log tracking the recipient requesting to be excluded from the recipient list for the unwanted thread message to other recipients in the recipient list for the unwanted thread message.

41. A client computing device, comprising:
means for receiving inbound electronic messages;
means for transmitting outbound electronic messages;
means for displaying an inbound electronic message received by the message receiving component;
means for creating an opt out message in response to an indication, by a recipient, to exclude subsequent inbound electronic messages in an electronic message thread to which the first inbound electronic message belongs; and
means for causing the transmitting means to deliver the opt out message to a message server,
wherein a log tracking the recipient requested to be excluded from the subsequent inbound electronic messages in the electronic message thread is delivered to other recipients of the subsequent inbound electronic messages in the electronic message thread.

42. The method of claim 1, wherein the electronic message and the indication to be excluded are received at the server from different entities.

* * * * *